US010129606B2

(12) United States Patent
Choi et al.

(10) Patent No.: US 10,129,606 B2
(45) Date of Patent: Nov. 13, 2018

(54) FACILITATING HIGH-DEFINITION PANORAMIC VIDEOS

(71) Applicant: KT Corporation, Seongnam-si, Gyeonggi-do (KR)

(72) Inventors: Hyung Ki Choi, Seongnam-si (KR); Yoonji Nam, Seoul (KR); Wang-sung Chun, Anyang-si (KR)

(73) Assignee: KT CORPORATION, Seongnam-si, Gyeonggi-Do (KR)

( * ) Notice: Subject to any disclaimer, the term of this patent is extended or adjusted under 35 U.S.C. 154(b) by 93 days.

(21) Appl. No.: 15/205,024

(22) Filed: Jul. 8, 2016

(65) Prior Publication Data
US 2017/0013327 A1    Jan. 12, 2017

(30) Foreign Application Priority Data
Jul. 8, 2015  (KR) .......................... 10-2015-0097427

(51) Int. Cl.
| H04N 7/08 | (2006.01) |
| H04N 21/81 | (2011.01) |
| H04N 21/472 | (2011.01) |
| H04N 21/218 | (2011.01) |
| G06F 3/14 | (2006.01) |
| G09G 5/36 | (2006.01) |

(52) U.S. Cl.
CPC ............ H04N 21/816 (2013.01); G06F 3/14 (2013.01); G09G 5/363 (2013.01); H04N 21/21805 (2013.01); H04N 21/47202 (2013.01); G09G 2340/04 (2013.01); G09G 2340/045 (2013.01); G09G 2340/0442 (2013.01); G09G 2340/0464 (2013.01); G09G 2340/14 (2013.01)

(58) Field of Classification Search
CPC ................. G06F 3/14; G09G 2340/04; G09G 2340/0442; G09G 2340/045; G09G 2340/0464; G09G 2340/14; G09G 5/363; H04N 21/21805; H04N 21/47202; H04N 21/816
USPC .......................................................... 348/38
See application file for complete search history.

(56) References Cited

U.S. PATENT DOCUMENTS

| 2011/0078721 A1* | 3/2011 | Wang ..................... H04N 7/162 725/25 |
| 2011/0116482 A1* | 5/2011 | Ansari ............... H04N 21/4122 370/338 |

(Continued)

FOREIGN PATENT DOCUMENTS

| JP | 2002269591 A | 9/2002 |
| JP | 2012222399 A | 11/2012 |

(Continued)

OTHER PUBLICATIONS

Hu et al, Deep 360 Pilot: Learning a deep agent for piloting through 360 degree sports videos (Year: 2017).*

*Primary Examiner* — Shan E Elahi
(74) *Attorney, Agent, or Firm* — Brundidge & Stanger, P.C.

(57) ABSTRACT

High definition panoramic videos may be facilitated by, e.g., assigning video controllers to respective panoramic videos or portions thereof; activating a first video controller assigned to a first one of the panoramic videos; and producing a first view-point perspective from the first panoramic video utilizing the activated controller.

18 Claims, 7 Drawing Sheets

(56) References Cited

U.S. PATENT DOCUMENTS

| | | | | |
|---|---|---|---|---|
| 2012/0229660 A1* | 9/2012 | Matthews | ............... | A63H 30/04 |
| | | | | 348/207.11 |
| 2014/0016708 A1* | 1/2014 | Wang | ..................... | H04N 19/70 |
| | | | | 375/240.25 |
| 2017/0013253 A1* | 1/2017 | Huber | ................. | H04N 13/0402 |
| 2017/0237964 A1* | 8/2017 | Maenpaa | ........... | H04N 13/0014 |
| | | | | 348/39 |
| 2017/0318325 A1* | 11/2017 | Ortiz | ................... | H04N 21/436 |

FOREIGN PATENT DOCUMENTS

| KR | 10-2003-0015765 A | 2/2003 |
|---|---|---|
| KR | 1020060058607 A | 5/2006 |
| KR | 10-2012-0133006 A | 12/2012 |
| KR | 10-2013-0088640 A | 8/2013 |

* cited by examiner

FACILITATING HIGH-DEFINITION PANORAMIC VIDEOS

CROSS-REFERENCE TO RELATED APPLICATION

This application claims the benefit of Korean Patent Application No. 2015-0097427 filed on Jul. 8, 2015, the disclosures of which are incorporated herein by reference.

TECHNICAL FIELD

The embodiments described herein pertain to providing high-definition panoramic videos via a set-top box.

BACKGROUND

A panoramic video is a video created by capturing views that provide up to a 360-degree perspective from a particular vantage point. Panoramic videos can be produced by geometrically calibrating and spatially merging images captured by one or more cameras.

Panoramic videos offer a wider angle perspective than more general photographic or video images, and can provide more realistic images.

When a set-top box (STB) receives a panoramic video from a content server, the STB performs a pre-treatment process, such as stitching, warping, or de-warping, in order not to distort the panoramic video, and the set-top box processes the video into a specific view (e.g., sphere, plane, cube, etc.) and displays the video on a screen.

SUMMARY

The present disclosure relates to, at least, a method including: respectively assigning multiple video controllers to multiple divided panoramic videos received from a panoramic video providing server; activating a first video controller assigned to a first panoramic video including a first view-point region; and producing the first view-point panoramic perspective.

The present disclosure pertains to, at least, a high-definition panoramic video service implemented by a low-specification set-top box (STB) in which a server performs a pre-treatment process on a panoramic video.

Further, the present disclosure pertains to, at least, a high-definition panoramic video service implemented by a low-specification STB in which multiple video controllers are respectively assigned to multiple divided panoramic videos, and the video controllers control at least production of the panoramic videos assigned thereto.

With regard to the example embodiments described herein, multiple video controllers may be respectively assigned to multiple divided panoramic videos received from a panoramic video providing server. A first video controller assigned to a first panoramic video, including a first view-point perspective, may be activated to reproduce at least a portion of the panoramic video from the first view-point perspective. Thus, it is possible to provide a high-definition panoramic video service to a low-specification high-definition panoramic video providing device (e.g., set-top box). That is, a server may pre-treat a panoramic video. Therefore, the set-top box may receive a panoramic video, or divided portions thereof, that have been processed prior to transmission from the server; and the STB may play the processed panoramic video.

In accordance with at least some of the embodiments described herein, it is possible to minimize hardware-dependence of a high-definition panoramic video providing device. Further, it is possible to provide a high-definition panoramic video service through a low-specification device.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Hereafter, the present disclosure will be described with reference to the exemplary embodiments illustrated in the accompanying drawings. For understanding of the present disclosure, throughout the accompanying drawings, like components are assigned like reference numerals. The configuration illustrated in the accompanying drawings is exemplified only to explain the present disclosure but not intended to limit the scope of the present disclosure.

DETAILED DESCRIPTION

Figure 1:
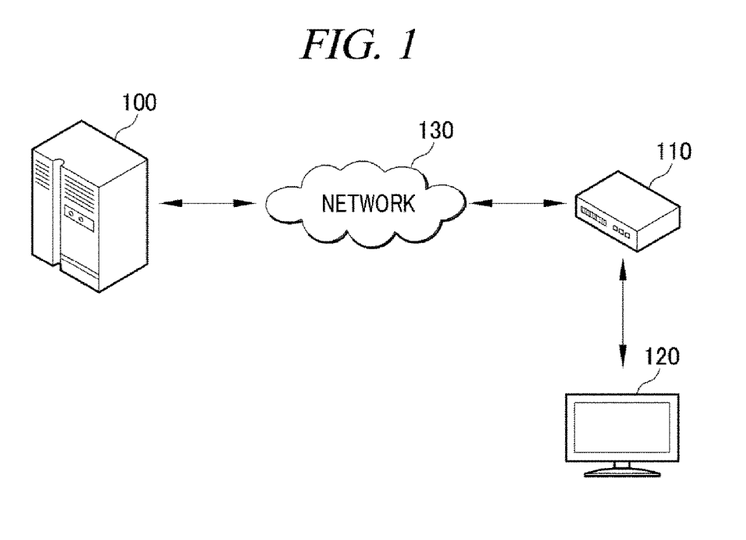
FIG. 1 is an example view of a high-definition panoramic video providing system, according to an exemplary embodiment described herein.

FIG. 1 is an example view of a high-definition panoramic video providing system, according to an exemplary embodiment described herein.

Referring to FIG. 1, a high-definition panoramic video system may include a panoramic video server 100, a high-definition panoramic video device 110, and a display device 120. However, the high-definition panoramic video system illustrated in FIG. 1 is just an exemplary embodiment of the present disclosure. Therefore, the present disclosure is not limited to the depiction of FIG. 1, and may have configurations different from the configuration illustrated in FIG. 1 according to various exemplary embodiments.

Panoramic video server 100 may pre-treat a panoramic video, prior to transmitting the panoramic video to the STB. Such pre-treatment may include, but not be limiting to, stitching, warping, or de-warping, to a full panoramic video; and divide the full panoramic video into at least two panoramic videos. Such pre-treatment of a panoramic video is performed prior to panoramic video server 100 transmitting multiple divided panoramic video portions to the high-definition panoramic video providing device 110, e.g., STB.

An STB may provide a comprehensive panoramic video, or divided portions thereof, for viewing or subsequent processing by merging portions of the received divided panoramic video portions in response to a user input changing a current view-point perspective while producing the pre-treated panoramic videos for display on a display device. Thus, it is possible to provide a high-definition panoramic video through a low-specification STB.

High-definition panoramic video device 110, e.g., STB, may respectively assign multiple video controllers to the multiple divided panoramic videos and may receive a current view-point input through a user interface.

High-definition panoramic video device 110, e.g., STB, may activate a video controller assigned to a panoramic video corresponding to a viewing perspective or region from a current vantage point or view-point input, and produce a current vantage point or view-point perspective through the display device 120. High-definition panoramic video providing device 110 may be, for example, a set-top box (STB), and the display device 120 may include, for example, an IPTV (Internet Protocol Television), a smart TV, and a connected TV.

Generally, the components of the high-definition panoramic video illustrated in FIG. 1 are connected to each other through a network 130. The network refers to a connection structure that enables information exchange between nodes such as devices, servers, etc. Examples of the network may include 3GPP (3rd Generation Partnership Project), LTE (Long Term Evolution), WIMAX (World Interoperability for Microwave Access), Wi-Fi (Wireless Fidelity), 3G, 4G, and the like, but are not limited thereto.

Hereinafter, the operations of the components of the high-definition panoramic video providing illustrated in FIG. 1 will be described in more detail.

Figure 2:
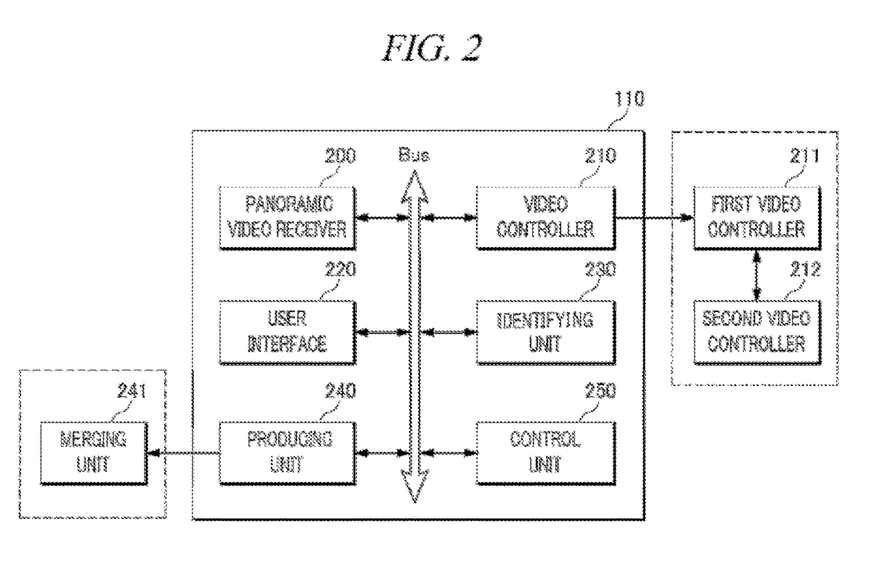
FIG. 2 is an example block diagram of a high-definition panoramic video providing device, according to an exemplary embodiment described herein.

FIG. 2 is an example block diagram of a high-definition panoramic video providing device, according to an exemplary embodiment described herein.

Referring to FIG. 2, high-definition panoramic video device 110 may include panoramic video receiver 200, video controller 210, user interface 220, identifying unit 230, production unit 240, and control unit 250. Video controller 210 may include first video controller 211 and second video controller 212. Production unit 240 may include merging unit 241. However, the high-definition panoramic video providing device 110 illustrated in FIG. 2 is just an exemplary embodiment of the present disclosure and can be modified in various ways on the basis of the components illustrated in FIG. 2.

For example, FIG. 2 illustrates that video controller 210 includes first video controller 211 and second video controller 212. However, video controller 210 may include first video controller 211 only or may further include more than two video controllers.

Panoramic video receiver 200 may receive, from panoramic video providing device 100, multiple panoramic videos. The multiple panoramic videos may correspond, respectively, to multiple perspectives or regions, as divided by panoramic video server 100. Herein, the panoramic videos may be divided by a pre-determined angle. For example, the panoramic videos may be made by dividing a full panoramic video at an angular interval of 90° and include a first panoramic video from 0 degrees to 90°, a second panoramic video from 90° to 180°, a third panoramic video from 180° to 270°, and a fourth panoramic video from 270° to 360°. Each of the multiple panoramic videos has a source (e.g., URL address). For example, the first panoramic video has a first source (www.streaming.com/90), the second panoramic video has a second source (www.streaming.com/180), the third panoramic video has a third source (www.streaming.com/270) and the fourth panoramic video has a fourth source (www.streaming.com/360). Panoramic video receiver 200 may receive the sources and receive the panoramic videos by using the sources (e.g., in a streaming manner). Here, the first panoramic video including a current view-point perspective or region, the second panoramic video that is adjacent to the first panoramic video and the third panoramic video that is adjacent to the first panoramic video are transmitted first. The fourth panoramic video is transmitted later by changing the current view-point perspective or region.

Further, panoramic video receiver 200 may transmit the sources to video controller 210. For example, panoramic video receiver 200 may transmit the first source for the first panoramic video to the video controller 210.

In this regard, a panoramic video will be described in detail with reference to FIG. 3.

Video controller 210 may send the identity of the sources of the panoramic videos received from the panoramic video providing server 100 to production unit 240. For example, video controller 210, e.g., the first video controller 211 assigned to the first panoramic video, may identify the first source for the first panoramic video, including the current view-point perspective or region, and send that identity including, e.g., corresponding vantage point information, to production unit 240. Video controller 210, e.g., the first video controller 211 assigned to the first panoramic video 210, may identify the second source for the second panoramic video when the current view-point perspective or region changes from the first panoramic video to the second panoramic video.

Further, video controller 210 may designate video controllers according to the number of panoramic videos, or divided portions thereof, received from panoramic video server 100. Otherwise, video controllers may be designated in advance and control unit 250 may assign the video controllers to the panoramic videos, respectively.

For example, if panoramic video receiver 200 receives a first panoramic video (from 0° to 90°), a second panoramic video (from 90° to 180°), a third panoramic video (from 180° to 270°), and a fourth panoramic video (from 270° to 360°), the video controller 210 may designate four video controllers.

Identifying unit 230 may determine which of the panoramic videos includes a perspective or region corresponding to the current view-point input.

Control unit 250 may assign multiple video controllers to multiple panoramic videos, respectively. For example, control unit 250 may assign a first video controller to the first panoramic video, a second video controller to the second panoramic video, a third video controller to the third panoramic video, and a fourth video controller to the fourth panoramic video.

Control unit 250 may activate a video controller assigned to a panoramic video, e.g., one of the divided portions thereof, including a pre-determined current view-point perspective or region. Control unit 250 may generate an executive command or instructions to execute at least one of the video controllers for the determined panoramic videos. Such command or instructions may include, e.g., the perspective or region corresponding to the current view-point input by Identifying unit 230. Control unit 250 may transfer the executive command to the at least one of the video controllers for the determined panoramic videos. For example, when first view-point is selected by a user, the first video controller 211 may be activated based on the executive command. In accordance with at least some embodiments, controller unit 250 may then deactivate the respective video controllers assigned to the other received panoramic videos. Here, Control unit 250 may generate a halt command or instruction to stop the respective video controllers assigned to the other received panoramic videos. For example, if control unit 250 activates first video controller 211 assigned to the first panoramic video, control unit 250 may hide the video controllers assigned to the first panoramic video (from 0° to 90°), the second panoramic video (from 90° to 180°), the third panoramic video (from 180° to 270°), and the fourth panoramic video (from 270° to 360°) based on the halt command or instruction.

For example, control unit 250 may activate the first video controller 211 by default to reproduce the first panoramic video, and if user interface 220 receives a user input to shift to a view-point corresponding to the second panoramic video, control unit 250 may deactivate, i.e., hide, first video controller 211 and activate second video controller 212 to reproduce the second panoramic video.

The first video controller 211 may transmit the first source for the first panoramic video and the coordinate values corresponding to the current view-point perspective or region to producing unit 240.

Meanwhile, if a current view-point corresponds to two or more panoramic videos, e.g., the first panoramic video and the second panoramic video, control unit 250 may activate first video controller 211 and second video controller 212, and deactivate the other video controllers.

Figure 3:
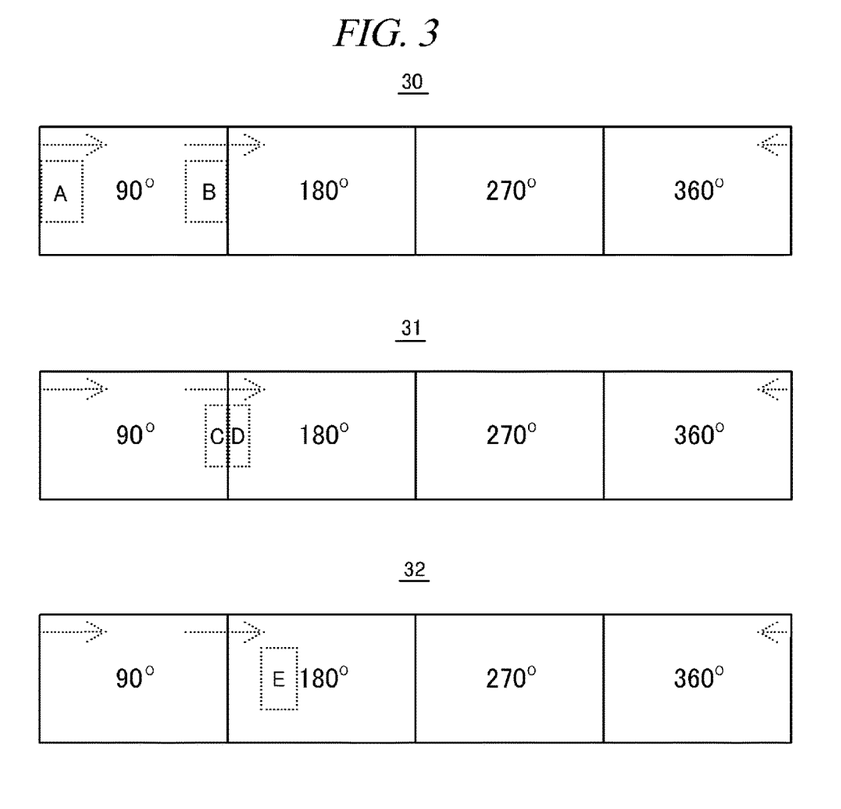
FIG. 3 illustrates a schematic example of a high-definition panoramic video, implemented according to an exemplary embodiment described herein.

Here, first video controller 211 may identify the first source for the first panoramic video and the coordinate values corresponding to the current view-point perspective or region in the first panoramic video, e.g., a first portion C in FIG. 3 to the producing unit 240. Second video controller 211 may identify the second source of the second panoramic video and the coordinate values corresponding to the current view-point perspective or region in the second panoramic video, e.g., a second portion D in FIG. 3 to the producing unit 240.

Producing unit 240 may receive the at least one of sources and the coordinate values from control unit 250, e.g., the first video controller 211 and the second video controller 212. Producing unit 240 may identify at least one of panoramic video to be played (e.g., at least one of the panoramic video corresponding to the received sources), by using the at least one of source. Producing unit 240 may produce at least a portion of the identified panoramic video corresponding to a first view-point perspective or region, in accordance with a first vantage point. For example, Producing unit 240 may produce images corresponding to the coordinate values sequentially. If a current view-point input is not received from the user, production unit 240 may reproduce images corresponding to a view-point, e.g., a view-point of the first panoramic video, as the basis of the panoramic video through display device 120.

User interface 220 may receive a current view-point input. For example, user interface 220 may receive a 180° current view-point input from the user while the first panoramic video is reproduced through the display device 120.

Identifying unit 230 may determine which of the panoramic videos includes a perspective or region corresponding to the current view-point input. For example, if user interface 220 receives a second view-point input, identifying unit 230 may determine which of the panoramic videos includes a second view-point perspective or region. Identifying unit 230 may track position of the current view-point perspective or region (the second view-point perspective or region). For example, identifying unit 230 may determine coordinate values corresponding to the current view-point perspective or region. Identifying unit 230 may determine which of the panoramic videos includes the second view-point perspective or region based on the position information of the current view-point perspective or region, e.g., coordinate values corresponding to the current view-point perspective or region. In the example, if identifying unit 230 determines that the first panoramic video includes the second view-point perspective, production unit 240 may produce the second view-point perspective from the first panoramic video on display device 120 the coordinate values. Further, if a 100° view-point is input as a current vantage point and the current vantage point is included in the second panoramic video, production unit 240 may produce the second panoramic video through the display device 120.

If identifying unit 230 determines that the second view-point perspective or region is included in the first panoramic video and the second panoramic video adjacent to the first panoramic video at the same time, control unit 250 may further activate second video controller 212 while the first video controller is being activated. For example, if a 180° view point is input as a current vantage point, and the current view-point is included in the first panoramic video (from 0° to) 90° and the second panoramic video (from 90° to 180°), the control unit 250 may further activate the second video controller 212 assigned to the second panoramic video (from 90° to 180°) while the first video controller assigned to the first panoramic video is being activated.

Second video controller 212 may transmit a source of the second panoramic video to production unit 240.

Merging unit 241 may merge an image corresponding to a second view-point perspective or region in the first panoramic video with an image corresponding to the second view-point perspective or region in the second panoramic video. For example, the merging unit 241 may include a canvas, e.g., HTML5 Canvas. The canvas may merge the image corresponding to the second view-point perspective or region in the first panoramic video with the image corresponding to the second view-point perspective or region in the second panoramic video. The Canvas may merge the images based on the coordinate values corresponding to the second view-point perspective or region.

For example, if a second view-point included in the first panoramic video and the second panoramic video is input by the user while a first view-point in the first panoramic video is produced for display on display device 120, merging unit 241 may merge a first image corresponding to the second view-point in the first panoramic video and an second image corresponding to the second view-point in the second panoramic video. In the example, merging unit 241 may arrange the first image in a position in accordance with coordinate values corresponding to the first image and the second image in a position in accordance with coordinate values corresponding to the second image in the Canvas such that merging unit 241 may generate an merged image as an image corresponding to the second view-point.

Production unit 240 may produce the merged image as the image corresponding to the second view-point.

Second video controller 212 may transmit the source of the second panoramic video to production unit 240, which may produce a second view-point perspective.

Meanwhile, it will be apparent to those skilled in the art that each of panoramic video receiver 200, video controller 210, user interface 220, identifying unit 230, producing unit 240, and control unit 250 can be implemented in a distributed manner or one or more of them can be implemented in a combined manner.

FIG. 3 illustrates a schematic example of a high-definition panoramic video, implemented according to an exemplary embodiment described herein.

High-definition panoramic video providing device 110 may receive, from the panoramic video providing server 100, one or more URL addresses (sources) of respective panoramic videos divided by a pre-determined angle. Each of the divided panoramic videos may have a different URL address.

For example, high-definition panoramic video device 110 may receive, from the panoramic video providing server 100, www.streaming.com/90 for the first panoramic video (from 0° to 90°), www.streaming.com/180 for the second panoramic video (from 90° to 180°), www.streaming.com/270 for the third panoramic video (from 180° to 270°), and www.streaming.com/360 for the fourth panoramic video (from 270° degree to 360°).

Referring to a reference numeral 30 in FIG. 3, the high-definition panoramic video providing device 110 may activate first video controller 211 assigned to the first panoramic video and produce a perspective A corresponding to a first vantage point.

Then, high-definition panoramic video device 110 may continuously receive a user input to shift a vantage point in a direction indicated by an arrow. While a perspective B is reproduced, the same input to shift a view-point may be received, so that a current vantage point perspective may be included in a second vantage point, e.g., a first portion C of the first panoramic video and a second portion D of the second panoramic video, i.e., perspective C and D (reference numeral 31 in FIG. 3).

In this case, high-definition panoramic video device 110 may activate second video controller 212 assigned to the second panoramic video, and may merge the first portion C and the second portion D as the second perspective C and D in the first panoramic video and the second panoramic video and reproduce the merged second perspective C and D.

In another example, while the second perspective C and D is reproduced, high-definition panoramic video device 110 may continuously receive a user input to shift a view-point in a direction indicated by an arrow, and if a current vantage point is shifted from a second vantage point to a third vantage point, e.g., a perspective E, high-definition panoramic video providing device 110 may deactivate first video controller 211 and reproduce an perspective E only (reference numeral 32 in FIG. 3).

Figure 4:
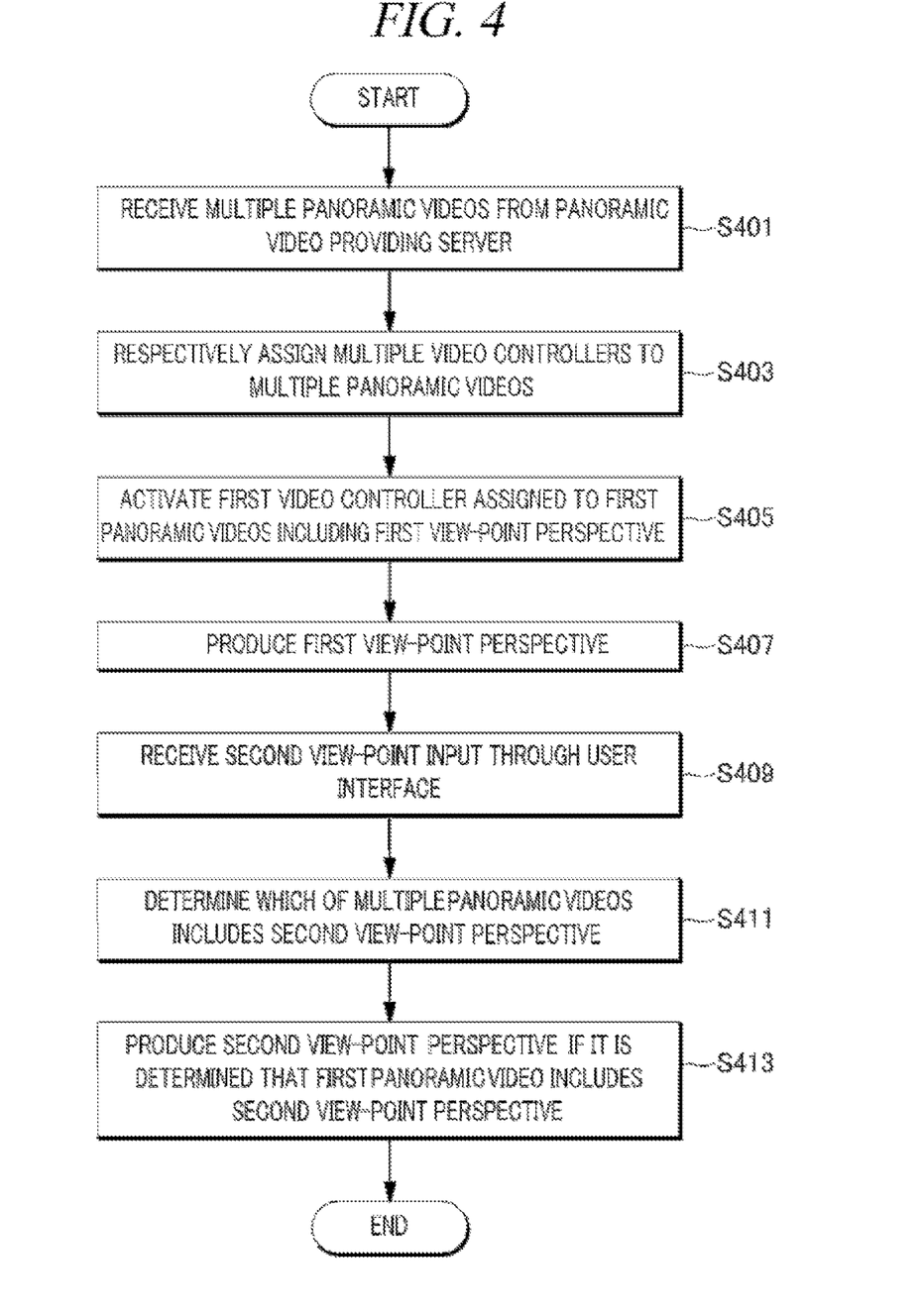
FIG. 4 is a flowchart illustrating an example processing flow for producing a high-definition panoramic video, according to an exemplary embodiment described herein.

FIG. 4 is a flowchart illustrating an example processing flow for producing a high-definition panoramic video, according to an exemplary embodiment described herein.

At block S401, high-definition panoramic video device 110 may receive, from the panoramic video providing server 100, multiple panoramic videos.

At block S403, high-definition panoramic video providing device 110 may assign multiple video controllers to the multiple panoramic videos, respectively.

At block S405, high-definition panoramic video providing device 110 may activate a first video controller assigned to a first panoramic video including a first view-point perspective.

At block S407, high-definition panoramic video providing device 110 may produce the first view-point perspective through display device 120.

At block S409, high-definition panoramic video providing device 110 may receive a second view-point input through the user interface.

At block S411, high-definition panoramic video providing device 110 may determine which of the multiple panoramic videos includes a second view-point perspective.

At block S413, if it is determined at block S411 that the first panoramic video includes the second vantage point perspective, high-definition panoramic video device 110 may produce the second vantage point perspective through display device 120.

In the descriptions above, blocks S401 to S413 may be divided into additional blocks or combined into fewer blocks depending on an exemplary embodiment. In addition, some of the blocks may be omitted and the sequence of the blocks may be changed if necessary.

Figure 5:
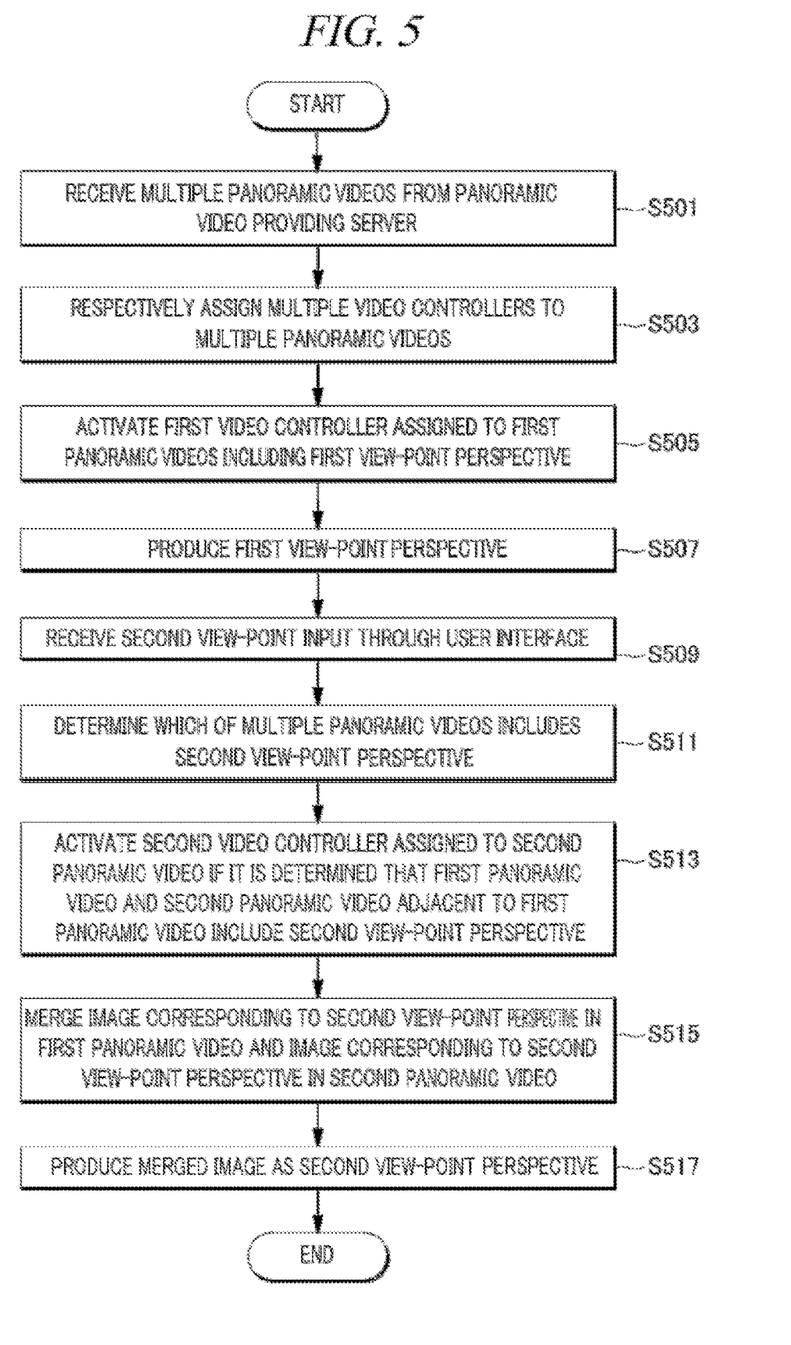
FIG. 5 is a flowchart illustrating another example processing flow producing a high-definition panoramic video, according to an exemplary embodiment.

FIG. 5 is a flowchart illustrating another example processing flow producing a high-definition panoramic video, according to an exemplary embodiment.

At block S501, high-definition panoramic video providing device 110 may receive, from panoramic video server 100, multiple panoramic videos.

At block S503, high-definition panoramic video device 110 may assign multiple video controllers to the multiple panoramic videos, respectively.

At block S505, high-definition panoramic video device 110 may activate a first video controller assigned to a first panoramic video including a first view-point perspective.

At block S507, high-definition panoramic video device 110 may produce the first view-point perspective through display device 120.

At block S509, high-definition panoramic video device 110 may receive a second view-point input through the user interface.

At block S511, high-definition panoramic video device 110 may determine which of the multiple panoramic videos includes a second view-point perspective.

At block S513, if it is determined at block S511 that the first panoramic video and a second panoramic video adjacent to the first panoramic video include the second vantage point perspective, high-definition panoramic video device 110 may activate a second video controller assigned to the second panoramic video.

At block S515, high-definition panoramic video device 110 may merge an image corresponding to the second view-point perspective in the first panoramic video and an image corresponding to the second view-point perspective in the second panoramic video.

At block S517, the high-definition panoramic video providing device 110 may produce the merged image at block S515 as the second vantage point perspective through display device 120.

In the descriptions above, blocks S501 to S517 may be divided into additional blocks or combined into fewer blocks depending on an exemplary embodiment. In addition, some of the blocks may be omitted and the sequence of the blocks may be changed if necessary.

Figure 6:
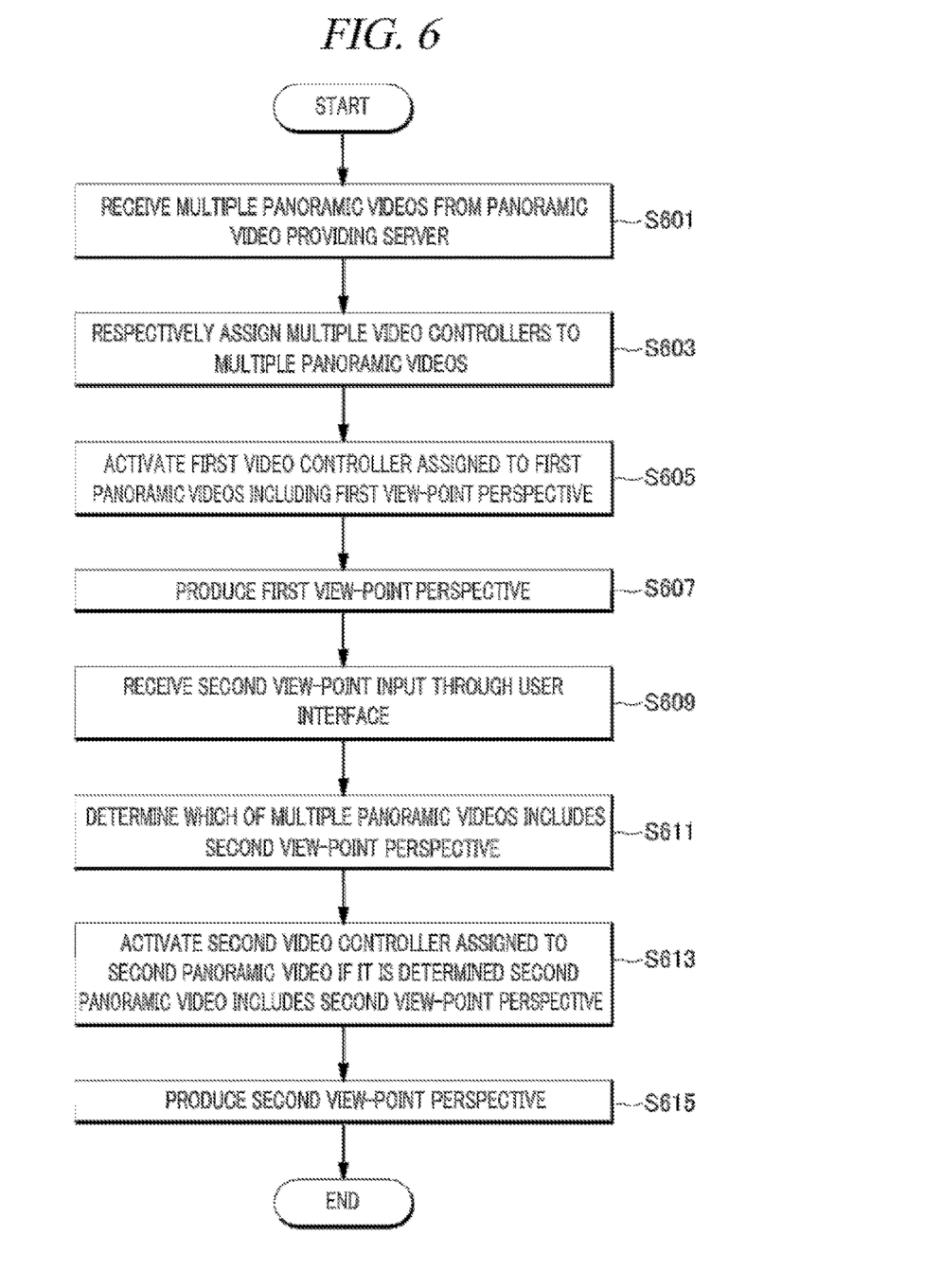
FIG. 6 is a flowchart illustrating yet another example processing flow producing a high-definition panoramic video, according to an exemplary embodiment described herein.

FIG. 6 is a flowchart illustrating yet another example processing flow producing a high-definition panoramic video, according to an exemplary embodiment described herein.

At block S601, high-definition panoramic video device 110 may receive, from the panoramic video server 100, multiple panoramic videos.

At block S603, the high-definition panoramic video device 110 may assign multiple video controllers to the multiple panoramic videos, respectively.

At block S605, high-definition panoramic video device 110 may activate a first video controller assigned to a first panoramic video including a first view-point perspective.

At block S607, the high-definition panoramic video device 110 may produce the first view-point perspective through display device 120.

At block S609, high-definition panoramic video device 110 may receive a second vantage point input through the user interface.

At block S611, high-definition panoramic video device 110 may determine which of the multiple panoramic videos includes a second view-point perspective.

At block S613, if it is determined at block S611 that a second panoramic video includes the second vantage point perspective, high-definition panoramic video device 110 may activate a second video controller assigned to the second panoramic video.

At block S615, high-definition panoramic video device 110 may produce the second vantage point perspective through display device 120.

In the descriptions above, blocks S601 to S615 may be divided into additional blocks or combined into fewer blocks depending on an exemplary embodiment. In addition, some of the blocks may be omitted and the sequence of the blocks may be changed if necessary.

Figure 7:
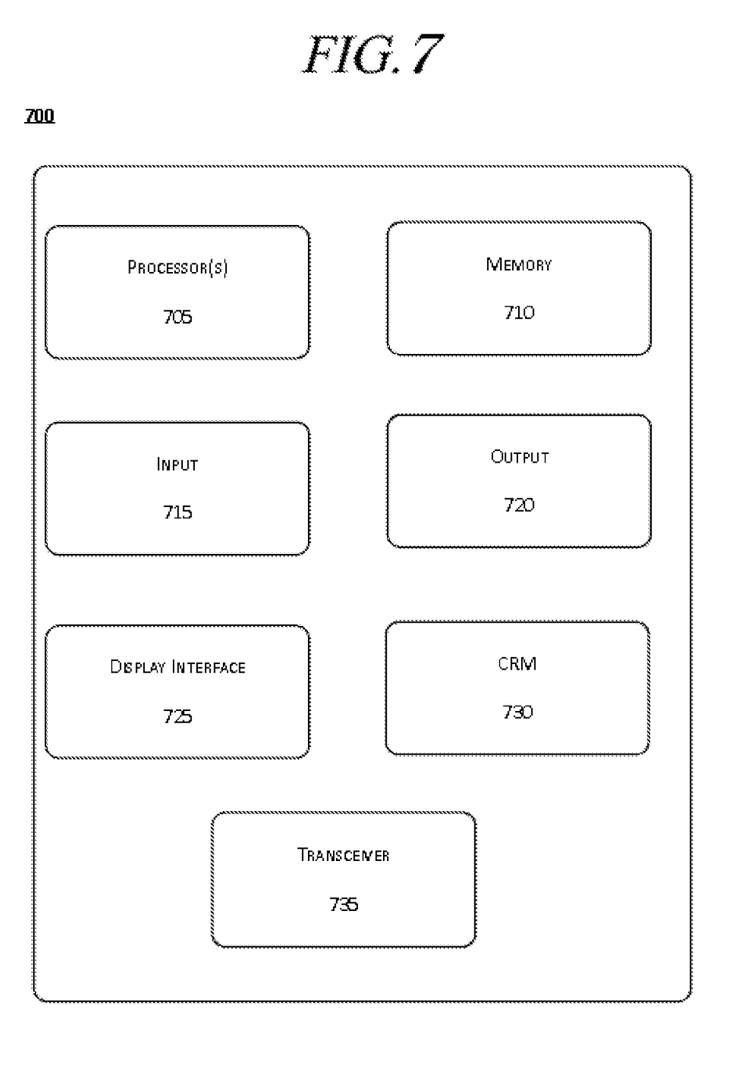
FIG. 7 is an exemplary computing environment in which high-definition panoramic videos may be facilitated or implemented, according to exemplary embodiments described herein.

FIG. 7 shows an illustrative computing embodiment, in which any of the processes and sub-processes of facilitating high-definition panoramic videos for a STB may be implemented as computer-readable instructions stored on a computer-readable medium. The computer-readable instructions may, for example, be executed by a processor of any one of panoramic video server 100 and/or high-definition panoramic video device 120, as referenced herein, having a network element and/or any other device corresponding thereto, particularly as applicable to the applications and/or programs described above corresponding to the configuration 700 for facilitating high-definition panoramic videos.

In a very basic configuration, a computing device 700 may typically include, at least, one or more processors 705 and a system memory 710. Computing device 500 may also include one or more input components 715, one or more output components 720, a display component 725, a computer-readable medium 730, and a transceiver 735.

Processor(s) 705 may refer to, e.g., a microprocessor, a microcontroller, a digital signal processor, or any combination thereof.

Memory 710 may refer to, e.g., a volatile memory, non-volatile memory, or any combination thereof. Memory 710 may store, therein, an operating system, an application, and/or program data. That is, memory 710 may store executable instructions to implement any of the functions or operations described above and, therefore, memory 710 may be regarded as a computer-readable medium.

Input component 715 may refer to a built-in or communicatively coupled keyboard, touch screen, or telecommunication device by which user input, e.g., to change a current view-point perspective. Further, an input component, if not built-in to computing device 700, may be communicatively coupled thereto via short-range communication protocols including, but not limited to, radio frequency or Bluetooth.

Output component 720 may refer to a component or module, which may be built-in or removable from computing device 700, which is configured to output data to an external device.

Display component 725 may refer to, e.g., a solid state display that may have touch input capabilities. That is, a display component may include capabilities that may be shared with or replace those of the aforementioned input components.

Computer-readable medium 730 may refer to a separable machine readable medium that is configured to store one or more programs that embody any of the functions or operations described above. That is, a computer-readable medium, which may be received into or otherwise connected to a drive component of computing device 700, may store executable instructions to implement any of the functions or operations described above. These instructions may be complimentary or otherwise independent of those stored by memory 710.

Transceiver 735 may refer to a network communication link for computing device 700, configured as a wired network or direct-wired connection. Alternatively, a transceiver may be configured as a wireless connection, e.g., radio frequency (RF), infrared, Bluetooth, and other wireless protocols.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

We claim:

1. A method of reproducing a panoramic video, comprising:
    receiving, from a video providing server, a plurality of panoramic videos of a divided panoramic video;
    assigning respective ones of a plurality of video controllers to each of the respective panoramic videos;
    activating, from among the plurality of assigned video controllers, a first video controller assigned to a first one of the panoramic videos;
    producing a first view-point perspective from the first panoramic video;
    receiving a second view-point selection through a user interface; and
    identifying which of the panoramic videos include a second view-point perspective corresponding to the second view-point selection.

2. The method of claim 1, further comprising:
    if the identified panoramic video is the first panoramic video, producing the second view-point perspective from the first panoramic video.

3. The method of claim 1, further comprising:
    if the identified panoramic videos are the first panoramic video and a second panoramic video, activating a second video controller of the assigned video controllers assigned to the second panoramic video;
    merging a first portion of the first panoramic video and a second portion of the second panoramic video, corresponding to the second view-point perspective; and
    producing a merger of the first and second portions as the second viewpoint perspective.

4. The method of claim 1, further comprising:
    if the identified panoramic video is the second panoramic video, deactivating the first video controller assigned to the first panoramic video;
    activating a second video controller of the assigned video controllers assigned to the second panoramic video; and
    producing the second view-point perspective from the second panoramic video.

5. The method of claim 1, wherein the plurality of panoramic videos is made by dividing a full panoramic video by a pre-determined angle.

6. The method of claim 1, wherein the receiving includes receiving a first panoramic video of the divided panoramic video, a second panoramic video of the divided panoramic video that is adjacent to the first panoramic video, and a third panoramic video of the divided panoramic video that is adjacent to the first panoramic video; and decoding the first panoramic video and at least one of the second panoramic video and the third panoramic video.

7. A device for producing a panoramic video, comprising:
a panoramic video receiver configured to receive, from a panoramic video providing server, a plurality of panoramic videos of a divided panoramic video;
a control unit configured to assign respective ones of a plurality of video controllers to each of the plurality of panoramic videos and to activate at least one of the assigned plurality of video controllers; and
a producing unit configured to reproduce a current view-point perspective from a first panoramic video of the plurality of panoramic videos.

8. The device of claim 7, further comprising:
a user interface configured to receive a first view-point perspective selection; and
a perspective identifying unit configured to identify which of the plurality of panoramic videos include the first view-point perspective,
wherein the producing unit is further configured to merge at least a first portion of the first panoramic video and a second portion of a second panoramic video of the plurality of panoramic videos.

9. The device of claim 8, wherein the plurality of video controllers include a first video controller and a second video controller,
the control unit is configured to assign the first video controller to the first panoramic video and activate the first video controller, and
the perspective video producing unit is configured to produce the first view-point perspective from the first panoramic video.

10. The device of claim 9, wherein the user interface is configured to receive a second view-point perspective selection, and
the perspective identifying unit is configured to identify which of the plurality of panoramic videos include the second view-point perspective.

11. The device of claim 10, wherein if the first panoramic video is identified, the perspective video producing unit is further configured to change a produced perspective from the first view-point perspective to the second view-point perspective and to produce the second view-point perspective from the first panoramic video.

12. The device of claim 10, wherein if the first panoramic video and the second panoramic video are identified, the control unit is further configured to assign the second video controller to the second panoramic video and to activate the second video controller, and the producing unit is further configured to merge a first perspective of the first panoramic video and a second perspective of the second panoramic video and to change a produced perspective from the first view-point perspective to the second view-point perspective and produce the merged first and second perspective.

13. The device of claim 10, wherein if the second panoramic video is identified, the control unit is further configured to deactivate the first video controller assigned to the first panoramic video, to assign the second video controller to the second panoramic video and to activate the second video controller, and the producing unit is further configured to change a producing perspective from the first view-point perspective to the second view-point perspective and to produce the second view-point perspective.

14. The device of claim 7, wherein the plurality of panoramic videos are made by dividing a full panoramic video by a pre-determined angle.

15. The device of claim 7, wherein the panoramic video receiver is configured to:
receive, from among the plurality of panoramic videos, the first panoramic video, a second panoramic video that is adjacent to the first panoramic video and a third panoramic video that is adjacent to the first panoramic video, and
decode the first panoramic video and at least one of the second panoramic video and the third panoramic video.

16. The device of claim 7, wherein the device is a set-top box.

17. A system, comprising:
a panoramic video providing server; and
a panoramic video providing device that includes a plurality of video controllers and a user interface,
wherein the panoramic video providing server is configured to:
generate a full panoramic video by performing at least one of a matching process, a merging process and a calibrating process,
divide the full panoramic video into a plurality of panoramic videos, and
transmit at least one of the plurality of panoramic videos to the panoramic video providing device, and
the panoramic video providing device is configured to:
receive the at least one of the plurality of panoramic videos transmitted by the panoramic video providing server,
assign one of the plurality of video controllers to each of the received plurality of panoramic videos, respectively,
receive a current view-point input through the user interface,
activate at least one of the assigned plurality of video controllers, and
reproduce a current view-point perspective.

18. The system of claim 17, wherein the panoramic video providing device is a set-top box.

* * * * *